US012418966B2

(12) United States Patent
Dai et al.

(10) Patent No.: US 12,418,966 B2
(45) Date of Patent: Sep. 16, 2025

(54) CONSTANT-CURRENT CONTROL CIRCUIT AND METHOD FOR CONSTANT-CURRENT CONTROL

(71) Applicant: HUNAN BIOMETA INTELLIGENT MANUFACTURING TECHNOLOGY CO., LTD, Changsha (CN)

(72) Inventors: Lizhong Dai, Changsha (CN); Yaping Xie, Changsha (CN); Jiangang Ling, Changsha (CN); Zhenfan Cui, Changsha (CN)

(73) Assignee: HUNAN BIOMETA INTELLIGENT MANUFACTURING TECHNOLOGY CO., LTD, Changsa (CN)

( * ) Notice: Subject to any disclaimer, the term of this patent is extended or adjusted under 35 U.S.C. 154(b) by 63 days.

(21) Appl. No.: 18/624,919

(22) Filed: Apr. 2, 2024

(65) Prior Publication Data

US 2024/0251492 A1 Jul. 25, 2024

Related U.S. Application Data

(63) Continuation of application No. PCT/CN2023/092749, filed on May 8, 2023.

(30) Foreign Application Priority Data

Oct. 18, 2022 (CN) ........................ 202211275030.4

(51) Int. Cl.
*H05B 45/345* (2020.01)

(52) U.S. Cl.
CPC .................................. *H05B 45/345* (2020.01)

(58) Field of Classification Search
CPC ...... H05B 45/345; H05B 45/14; H05B 45/40; H05B 45/46; H05B 45/395; H05B 45/36
See application file for complete search history.

(56) References Cited

U.S. PATENT DOCUMENTS 9,807,826 B2 * 10/2017 Xiong ................. H05B 45/375
2008/0116818 A1 5/2008 Shteynberg et al.
(Continued)

FOREIGN PATENT DOCUMENTS

CN 204203690 U 3/2015
CN 105101551 A 11/2015
(Continued)

OTHER PUBLICATIONS

Extended European Search Report issued in counterpart European Patent Application No. 23866707.5, dated Feb. 7, 2025.
(Continued)

*Primary Examiner* — Abdullah A Riyami
*Assistant Examiner* — Syed M Kaiser
(74) *Attorney, Agent, or Firm* — Westbridge IP LLC

(57) ABSTRACT

Disclosed are a constant-current control circuit and a method for constant-current control. The circuit includes: a load module, including a plurality of load units connected in parallel; a controller, connected to each load unit of the load units and configured to output a first level signal to the load unit; and a constant-current control module, connected to the controller and further connected to each load unit of the load units via at least one divided resistor, configured to receive a first voltage signal sent by the controller, and generate a second level signal and a second voltage signal according to the first voltage signal and output the second level signal and the second voltage signal to the load module.

20 Claims, 3 Drawing Sheets

(56) References Cited

U.S. PATENT DOCUMENTS

| | | | | |
|---|---|---|---|---|
| 2009/0207109 | A1* | 8/2009 | Wu | H05B 45/347 345/82 |
| 2009/0212710 | A1 | 8/2009 | Matsui et al. | |
| 2011/0109231 | A1* | 5/2011 | Shiu | H05B 45/56 315/122 |
| 2015/0061524 | A1* | 3/2015 | Kunimatsu | H05B 45/10 315/307 |
| 2017/0164434 | A1* | 6/2017 | Xiong | F21V 23/06 |
| 2021/0112642 | A1 | 4/2021 | Sherriff | |
| 2023/0090839 | A1* | 3/2023 | Xiong | H05B 45/50 315/127 |
| 2023/0171858 | A1* | 6/2023 | Han | H05B 45/48 |

FOREIGN PATENT DOCUMENTS

| | | | |
|---|---|---|---|
| CN | 213461563 | U | 6/2021 |
| CN | 115604881 | A | 1/2023 |

OTHER PUBLICATIONS

International Search Report and Written Opinion issued in corresponding PCT Application No. PCT/CN2023/092749, dated Aug. 21, 2023.

* cited by examiner

CONSTANT-CURRENT CONTROL CIRCUIT AND METHOD FOR CONSTANT-CURRENT CONTROL

CROSS-REFERENCE TO RELATED APPLICATIONS

The present disclosure is a continuation of International Application No. PCT/CN2023/092749, filed on May 8, 2023, which claims priority to Chinese Patent Application No. 202211275030.4, filed on Oct. 18, 2022. All of the aforementioned patent applications are hereby incorporated by reference in their entireties.

TECHNICAL FIELD

The present disclosure relates to the field of electrical technologies, and in particular, to a constant-current control circuit and a method for constant-current control.

BACKGROUND

A semiconductor device (such as an LED, a light-emitting diode) which is sensitive to characteristics and has negative temperature characteristics, needs to stabilize a working state and protection during an application process, and thus a concept of driving is generated. A main function of a constant-current driving circuit is to convert an alternating current voltage into a constant-current power supply, and at the same time complete matching between a voltage and a current of a load element according to a requirement of the load element. FIG. 1 schematically shows an existing constant-current driving circuit, and an operational amplifier constant-current driving circuit shown in FIG. 1 mainly uses a "voltage following characteristic" of an operational amplifier, that is, a circuit characteristic that voltages of two input pins 2 and 3 of the operational amplifier are equal. When a stable power supply voltage Vin is input to a resistor R7, a voltage across a current-limiting resistor R8 is unchanged (that is, a value of this voltage is Vin), so no matter how an external circuit changes, a current passing through the current-limiting resistor R8 is constant. A current of a load is equal to a current of the current-limiting resistor R8, so that even if a power supply of the load is a variable voltage power supply, the current passing through the load remains fixed, thereby achieving an effect of constant-current.

In order to realize independent control of a plurality of load elements, an existing constant-current driving circuit generally adopts multi-channel electrical signals (that is, Digital-to-Analog Converter (DAC) signals) subjected to digital/analog conversion for control, the DAC signals are output by a multi-channel control chip (or output by a plurality of common control chips), and a plurality of operational amplifiers are required to process multi-channel DAC signals, which occupies a large area on a Printed Circuit Board (PCB). Meanwhile, in order to ensure that there is no residual voltage on the load elements when the load elements are turned off (for example, it is ensured that there is no micro-bright jitter when an LED is turned off), a P-Metal-Oxide-Semiconductor (PMOS) transistor needs to be added to ensure complete cut-off of a power supply. Therefore, an entire constant-current driving circuit uses more resources and is not integrated enough.

SUMMARY

An objective of the present disclosure provides a constant-current control circuit and a method for constant-current control in order to overcome problems that an existing constant-current driving circuit uses more electrical elements resources, occupies a large area on a PCB board, and is not integrated enough.

In order to achieve the foregoing objective, a first aspect of the present disclosure provides a constant-current control circuit, and the circuit includes:

- a load module, including a plurality of load units connected in parallel;
- a controller, connected to each load unit of the plurality of load units and configured to output a first level signal to the load unit; and
- a constant-current control module, connected to the controller and further connected to each load unit of the plurality of load units via at least one divided resistor, configured to receive a first voltage signal sent by the controller, and generate a second level signal and a second voltage signal according to the first voltage signal and output the second level signal and the second voltage signal to the load module.

In an embodiment of the present disclosure, the constant-current control module includes an operational amplifier, a non-inverting input terminal of the operational amplifier is connected to the controller, an inverting input terminal of the operational amplifier is connected to the load module, and an output terminal of the operational amplifier is connected to each load unit of the plurality of load units via the at least one divided resistor.

In an embodiment of the present disclosure, the non-inverting input terminal of the operational amplifier is connected to the controller via a first resistor.

In an embodiment of the present disclosure, the load unit includes:

- a load element; and
- a switching element connected to the load element, where the switching element is connected to the controller and is connected to the constant-current control module via at least one divided resistor.

In an embodiment of the present disclosure, the switching element is an NMOS transistor, the controller is connected to a gate of the NMOS transistor, the constant-current control module is connected to a gate of the NMOS transistor via the at least one divided resistor, a drain of the NMOS transistor is connected to the load element, and a source of the NMOS transistor is connected to the constant-current control module.

In an embodiment of the present disclosure, the switching element is a triode, the controller is connected to a base of the triode, the constant-current control module is connected to the base of the triode via the at least one divided resistor, a collector of the triode is connected to the load element, and an emitter of the triode is connected to the constant-current control module.

In an embodiment of the present disclosure, the circuit further includes a filter capacitor, an end of the filter capacitor is connected to the constant-current control module, and another end of the filter capacitor is connected to a grounding point via at least one filter resistor.

In an embodiment of the present disclosure, the circuit further includes a current-limiting resistor, and the current-limiting resistor is connected between the constant-current control module and a grounding point.

In an embodiment of the present disclosure, the load element is an LED, an anode of the LED is connected to a power supply, and a cathode of the LED is connected to the switching element.

A second aspect of the present disclosure provides an electronic device, which includes the constant-current control circuit described above.

A third aspect of the present disclosure provides a method for constant-current control, which is applied to the constant-current control circuit described above, and the method includes:

- outputting, by the controller, the first level signal to the load unit to control the load unit to be opened or closed; and
- receiving, by the constant-current control module, a first voltage signal sent by the controller, and generating the second level signal and the second voltage signal according to the first voltage signal and outputting the second level signal and the second voltage signal to the load module.

The second voltage signal is configured to control a magnitude of a current passing through the load unit.

In an embodiment of the present disclosure, the second level signal is a high-level signal in a case that the first voltage signal is a positive voltage.

In an embodiment of the present disclosure, the outputting, by the controller, the first level signal to the load unit to control the load unit to be opened or closed, includes:

- controlling the load unit to be opened in a case that the first level signal is a high-level signal and the second level signal is a high-level signal; and
- controlling the load unit to be closed in a case that at least one of the first level signal and the second level signal is a low-level signal.

According to the foregoing technical solutions, the controller may cooperate with the constant-current control module to control opening or closing of the plurality of load units and a magnitude of a current passing through the load unit without increasing the number of constant-current control related devices and redundant switch transistors in a circuit. Moreover, the opening or closing of each individual load unit may be independently controlled, the circuit is simple, the number of devices is reduced, and highly integrated is achieved.

Other features and advantages of the embodiments of the present disclosure will be described in detail in the following detailed descriptions of the embodiments.

BRIEF DESCRIPTION OF THE DRAWINGS

The accompanying drawings are used to provide a further understanding of the embodiments of the present disclosure, constitute a part of the specification, and are used to explain the embodiments of the present disclosure together with the following specific embodiments, but do not constitute a limitation on the embodiments of the present disclosure. In the accompanying drawings.

DETAILED DESCRIPTION OF THE EMBODIMENTS

Detailed descriptions of specific implementations of the present disclosure are described in detail below with reference to the accompanying drawings. It should be understood that the described specific implementations are only used to illustrate and explain the present disclosure, and are not intended to limit the present disclosure.

It should be noted that if there is a directional indication (such as upper, lower, left, right, front, or rear) involved in the embodiments of the present disclosure, the directional indication is only used to explain a relative positional relationship, a motion situation, and the like between components under a specific posture (as shown in the accompanying drawings), and if the specific posture is changed, the directional indication is changed accordingly.

In addition, if descriptions such as "first" and "second" are included in the embodiments of the present disclosure, descriptions such as "first" and "second" are only used for a purpose of description, and cannot be understood as indicating or implying their relative importance or implicitly indicating the number of indicated technical features. Thus, features defined with "first" and "second" may explicitly or implicitly include at least one of the features. In addition, technical solutions between the embodiments may be combined with each other, but it must be based on an implementation by a person of ordinary skill in the art, and when a combination of the technical solutions is contradictory or cannot be implemented, it should be considered that the combination of the technical solutions does not exist, and is not within a protection scope of the present disclosure.

Figure 1:
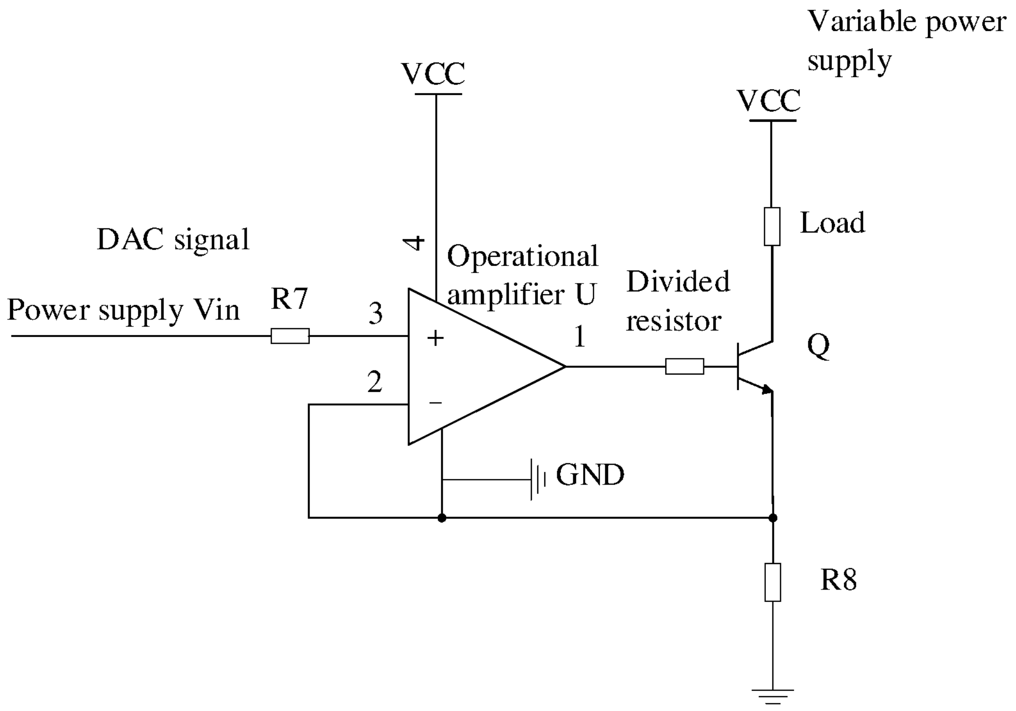
FIG. 1 (Prior Art)
FIG. 1 schematically shows an existing constant-current driving circuit.
Figure 2:
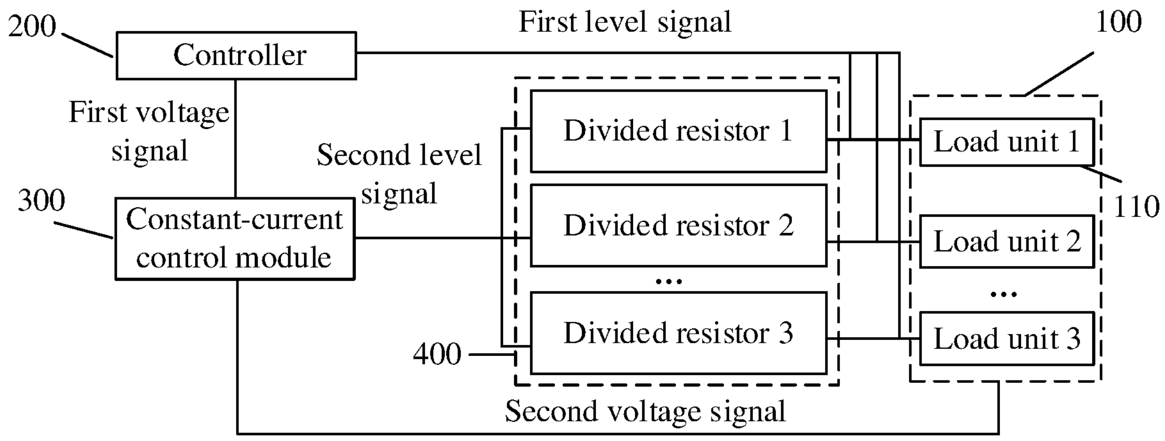
FIG. 2 schematically shows a schematic circuit topology diagram of a constant-current control circuit according to an embodiment of the present disclosure.

FIG. 2 schematically shows a schematic circuit topology diagram of a constant-current control circuit according to an embodiment of the present disclosure. As shown in FIG. 2, in an embodiment of the present disclosure, a constant-current control circuit is provided, and the circuit may include:

- a load module 100, including a plurality of load units 110 connected in parallel;
- a controller 200, connected to each load unit of the load units 110 and configured to output a first level signal to the load unit 110; and
- a constant-current control module 300, connected to the controller 200 and further connected to each load unit of the load units 110 via at least one divided resistor 400, configured to receive a first voltage signal sent by the controller 200, and generate a second level signal and a second voltage signal according to the first voltage signal and output the second level signal and the second voltage signal to the load module 100.

In an embodiment of the present disclosure, the load unit 110 includes:

- a load element; and
- a switching element connected to the load element, where the switching element is connected to the controller 200 and is connected to the constant-current control module 300 via at least one divided resistor.

The controller 200 cooperates with the constant-current control module 300 to control opening or closing of the plurality of load units 110 and a magnitude of a current passing through the load unit 110. Because the divided resistor 400 is provided in the circuit, the opening or closing of each individual load unit 110 can be independently controlled.

Figure 3:
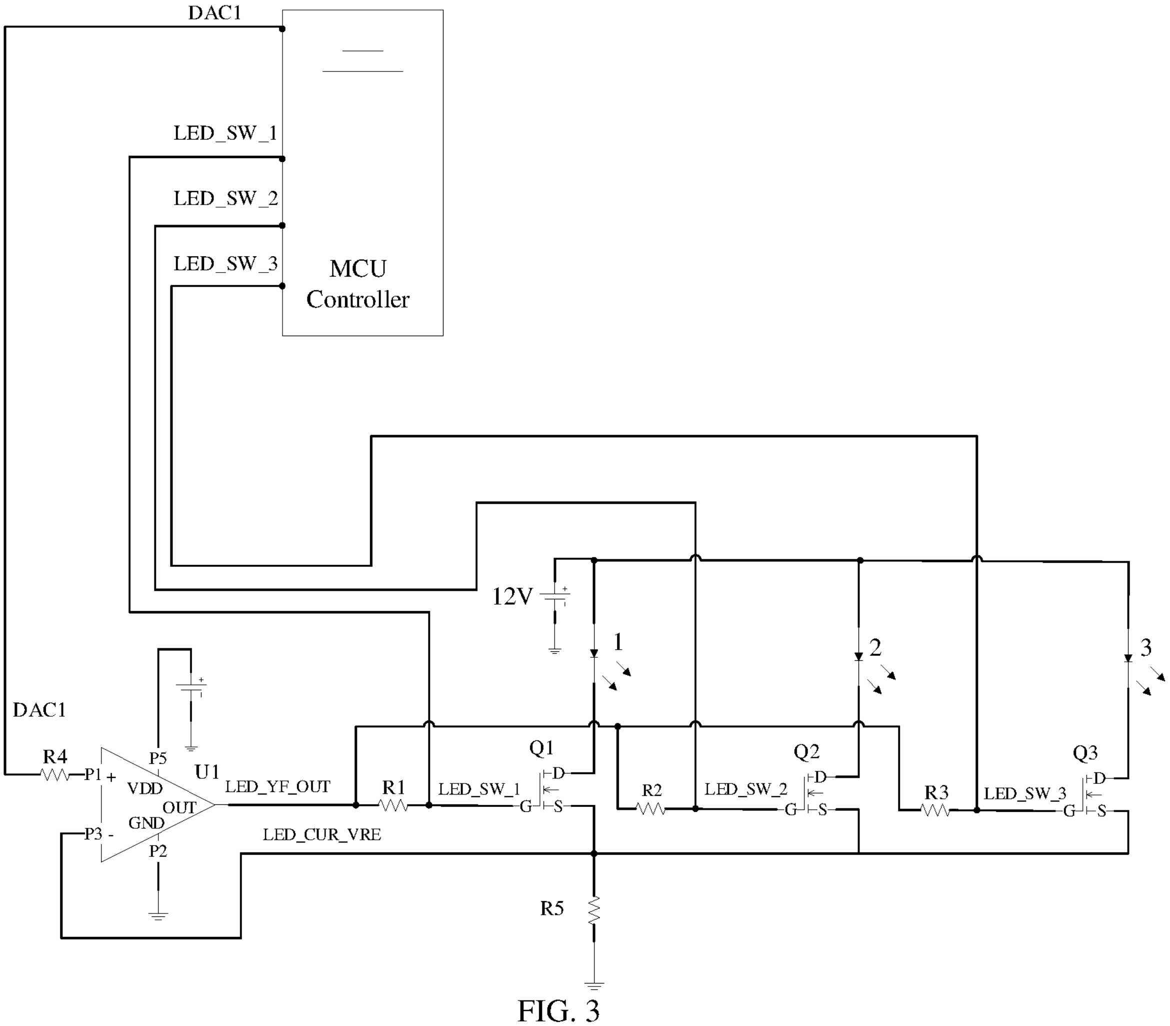
FIG. 3 schematically shows a circuit topology diagram of a constant-current control circuit according to an embodiment of the present disclosure.

FIG. 3 schematically shows a circuit topology diagram of a constant-current control circuit according to an embodiment of the present disclosure. As shown in FIG. 3, a load module 100 includes three load units 110 connected in parallel, and each load unit 110 includes a load element and a switching element connected to the load element. The load elements may be LEDs 1, 2, and 3 shown in FIG. 2, anodes of the LEDs 1, 2, and 3 are connected to a power supply, and cathodes of the LEDs 1, 2, and 3 are connected to the switching elements. It should be noted that the load elements may also be all loads that need constant-current control other than the LED.

In an embodiment of the present disclosure, the controller is a Micro-controller Unit (MCU) controller, and the MCU controller is also referred to as a Single Chip Microcomputer, and a D/A converter (digital-to-analog converter) is integrated in the MCU controller. An actual circuit of an actual electronic device is mostly a circuit that mixes an analog signal with a digital signal, an internal signal output unit of the electronic device outputs a digital signal to the constant-current control circuit in the embodiment of the present disclosure, and the digital signal is converted by a D/A converter inside the MCU controller and is converted into an electrical signal that can be recognized and applied in the circuit, that is, a first voltage signal DAC1, which is output to the constant-current control module 300.

In an embodiment of the present disclosure, the MCU controller is connected to the three load units 110 connected in parallel, the MCU controller includes a plurality of common pins, and the MCU controller outputs three first level signals LED_SW_1, LED_SW_2, and LED_SW_3 via three common pins, to respectively control opening or closing of each of LEDs 1, 2 and 3 of a single load unit 110.

In an embodiment of the present disclosure, the constant-current control module 300 includes an operational amplifier U1, a non-inverting input terminal P1 of the operational amplifier U1 is connected to the controller, an inverting input terminal P3 of the operational amplifier U1 is connected to the load module 100, and an output terminal OUT of the operational amplifier U1 is connected to each of the load units 110 via at least one divided resistor R1, R2, or R3.

The constant-current control module 300 includes an operational amplifier U1. An operational amplifier ("Op-Amp" for short), which is a circuit unit with a very high magnification, and most of the operational amplifiers exist in a form of a single chip. There are many kinds of operational amplifiers, which are widely used in an electronic industry. A magnification A of the operational amplifier may be expressed as:

$$A = \frac{u_0}{u_+ - u_-}$$

$u_0$ is a voltage output by an output terminal of the operational amplifier, $u_+$ is a voltage of a non-inverting input terminal of the operational amplifier, and $u_-$ is a voltage of an inverting input terminal of the operational amplifier. An idea magnification of an operational amplifier may be regarded as infinite, that is, $A \rightarrow \infty$, and therefore, $u_+ - u_- = 0$, $u_+ = u_-$. That is, for the operational amplifier, a potential of the non-inverting input terminal is equal to a potential of the inverting input terminal, which is a "virtual short" characteristic of the operational amplifier.

A non-inverting input terminal P1 of the operational amplifier U1 is connected to the MCU controller. Further, for a consideration of circuit protection or voltage drop control, a resistor (first resistor) R4 may be provided between the MCU controller and the non-inverting input terminal P1, a negative power supply terminal P2 of the operational amplifier U1 is connected to a grounding point, and a positive power supply terminal P5 is connected to a 3.3V power supply. The output terminal OUT of the operational amplifier U1 is connected to each load unit 110 via a divided resistor R1, R2, or R3. After receiving the first voltage signal DAC1 via the non-inverting input terminal P1, the operational amplifier U1 output a level signal, that is, the second level signal LED_YF_OUT, via the output terminal OUT of the operational amplifier U1 according to a voltage carried by the first voltage signal DAC1, which is configured to control opening or closing of the LEDs 1, 2, and 3 of all the load units 110 included in the load module 100. Whether the second level signal LED_YF_OUT is a high-level signal or a low-level signal is determined by the voltage carried by the first voltage signal DAC1, and when the voltage carried by the first voltage signal DAC1 is positive, the second level signal LED_YF_OUT is a high-level signal.

After receiving the first voltage signal DAC1 via the non-inverting input terminal P1, the operational amplifier U1 generates a second voltage signal LED_CUR_VRE according to the voltage carried by the first voltage signal DAC1 and outputs the second voltage signal LED_CUR_VRE to the load module 100 for controlling a current passing through each load unit 110. Because the "virtual short" characteristic of the operational amplifier U1, that is, a potential of the non-inverting input terminal P1 is equal to a potential of the inverting input terminal P3, an information carried in the second voltage signal LED_CUR_VRE is "a voltage equal to the voltage carried by the first voltage signal DAC1" or "a voltage equal to a voltage of the first voltage signal DAC1 after a voltage drop of the R4".

In an embodiment of the present disclosure, the constant-current control circuit further includes a current-limiting resistor R5, and the current-limiting resistor R5 is connected between the constant-current control module 300 and a grounding point.

The constant-current control circuit further includes the current-limiting resistor R5, a voltage carried by the second voltage signal LED_CUR_VRE forms a constant current on the current-limiting resistor R5, and the constant current is a current that pass through each load unit 110.

In an embodiment of the present disclosure, the switching elements are N-Metal-Oxide-Semiconductor (NMOS) transistors Q1, Q2 and Q3, the controller 200 is connected to gates G of the NMOS transistors Q1, Q2 and Q3, and the constant-current control module 300 is connected to the gates G of the NMOS transistors Q1, Q2 and Q3 via the divided resistors R1, R2 and R3 respectively. Drains D of the NMOS transistors Q1, Q2 and Q3 are connected to the load elements respectively, and sources S of the NMOS transistors are connected to the constant-current control module 300.

The switching elements may be NMOS transistors Q1, Q2 and Q3, the NMOS transistors are N-type metal oxide field effect transistors. The MCU controller is connected to gates G of the NMOS transistors Q1, Q2 and Q3, the output terminal OUT of the operational amplifier U1 is connected to the gates G of the NMOS transistors Q1, Q2 and Q3 via the divided resistors R1, R2 and R3, the drains D of the NMOS transistors Q1, Q2 and Q3 are connected to cathodes of the LEDs 1, 2 and 3 respectively, and the sources S of the NMOS transistors are connected to the inverting input terminal P3 of the operational amplifier U1.

When the second level signal LED_YF_OUT is a high-level signal, that is, all of the LEDs 1, 2, and 3 in the load module 100 meet a necessary condition for opening. Because when the second level signal LED_YF_OUT is a high-level signal, the second voltage signal LED_CUR_VRE carries the voltage determined by the first voltage signal DAC1 and outputs the voltage to the current-limiting resistor R5 to form a constant current.

In a case that the second level signal LED_YF_OUT is at a high level, when the first level signal LED_SW_1 is a high-level signal, the NMOS transistor Q1 is opened, and the LED1 is opened; when the first level signal LED_SW_2 is a high-level signal, the NMOS transistor Q2 is opened, and the LED2 is opened; and when the first level signal LED_SW_3 is a high-level signal, the NMOS transistor Q3 is opened, and the LED3 is opened. When the first level signal LED_SW_1 is a low-level signal, the NMOS transistor Q1 is closed, and the LED1 is closed; when the first level signal LED_SW_2 is a low-level signal, the NMOS transistor Q2 is closed, and the LED2 is closed; and when the first level signal LED_SW_3 is a low-level signal, the NMOS transistor Q3 is closed, and the LED3 is closed.

When the second level signal LED_YF_OUT is a low-level signal, that is, all of the LEDs 1, 2, and 3 in the load module 100 do not meet a necessary condition for opening. Because when the second level signal LED_YF_OUT is a low-level signal, that is, the first voltage signal DAC1 is 0, and a voltage output from the second voltage signal LED_CUR_VRE to the current-limiting resistor R5 is also 0, so that a constant current cannot be formed. Therefore, even if the first level signals LED_SW_1, LED_SW_2, and LED_SW_3 are high-level signals, which may make the NMOS transistor Q1, Q2, and Q3 opened, the LEDs 1, 2, and 3 still cannot be opened in absence of a constant current generated by the second voltage signal LED_CUR_VRE.

That is, specific opening or closing of each of the LEDs 1, 2, and 3 is controlled independently by the first level signal LED_SW_1, LED_SW_2, or LED_SW_3 output from the MCU controller, and the first level signals LED_SW_1, LED_SW_2, and LED_SW_3 control the opening or closing of the NMOS transistors Q1, Q2, and Q3 to control opening or closing of the circuit, thereby ensuring that the LEDs 1, 2, and 3 do not have micro-bright jitter due to a drift of an output signal of the operational amplifier U1.

Because the first level signals LED_SW_1, LED_SW_2, and LED_SW_3 and the second level signal LED_YF_OUT are all level signals, in order to achieve independent control of each of the LEDs 1, 2, and 3, at least one divided resistor R1, R2, or R3 needs to be disposed between the output terminal OUT of the operational amplifier U1 and each load unit 110, so that control information carried by two level signals can be correctly received and implemented without disturbing each other.

A control flow of the constant-current control circuit provided in the embodiment of the present disclosure according to a signal transmission sequence may be described as:

the MCU controller outputs the first voltage signal DAC1 to the non-inverting input terminal P1 of the operational amplifier U1, the operational amplifier U1 generates the second level signal LED_YF_OUT and the second voltage signal LED_CUR_VRE according to the voltage carried by the first voltage signal DAC1, and the second voltage signal LED_CUR_VRE carries a voltage equal to the first voltage signal DAC1 (or a voltage of DAC1 after a voltage drop of the R4) by using the "virtual short" characteristic of the operational amplifier U1 to form a constant current at the current-limiting resistor R5, which is a constant current that passes through each of the LEDs 1, 2, and 3. The current passing through each of the LEDs 1, 2, and 3 remains fix even if the power supply of the LEDs 1, 2, and 3 is a variable voltage source.

The second level signal LED_YF_OUT is transmitted to each of the NMOS transistors Q1, Q2, and Q3 via divided resistors R1, R2 and R3, and all LEDs 1, 2, and 3 meet a necessary condition for opening. In order to independently control each of the LEDs 1, 2, and 3, the MCU controller sends three first level signals LED_SW_1, LED_SW_2, and LED_SW_3. In a case that the first level signals LED_SW_1, LED_SW_2, and LED_SW_3 are at a high level, the NMOS transistors Q1, Q2, and Q3 are opened, and the LEDs 1, 2, and 3 are opened.

In another embodiment of the present disclosure, the switching element may also be a triode, the controller is connected to a base of the triode, the constant-current control module is connected to the base of the triode via the at least one divided resistor, a collector of the triode is connected to the load element, and an emitter of the triode is connected to the constant-current control module.

Specifically, a base of the triode is connected to the MCU controller and is connected to the output terminal of the operational amplifier via the divided resistor, a collector of the triode is connected to the cathode of the LED, an emitter of the triode is connected to the inverting input terminal of the operational amplifier, and the opening or closing of the circuit is realized by using a switching characteristic of the triode.

In an embodiment of the present disclosure, the constant-current control circuit further includes a filter capacitor, an end of the filter capacitor is connected to the constant-current control module 300, and another end of the filter capacitor is connected to a grounding point via at least one filter resistor.

Figure 4:
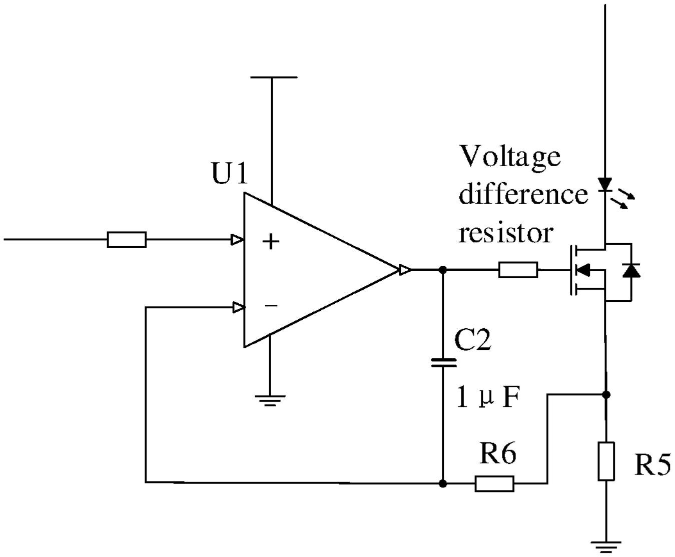
FIG. 4 schematically shows a circuit topology diagram of a constant-current control circuit added with a filter capacitor and a filter resistor according to an embodiment of the present disclosure.

FIG. 4 schematically shows a circuit topology diagram of a constant-current control circuit added with a filter capacitor C2 and a filter resistor R6 according to an embodiment of the present disclosure. As shown in FIG. 4, the constant-current control circuit further includes the filter capacitor C2, an end of the filter capacitor C2 is connected to an output terminal of the operational amplifier, and another end of the filter capacitor C2 is connected to the filter resistor R6, and is connected to a grounding point via a current-limiting resistor R5, so as to prevent a noise interference of the first voltage signal from causing micro-bright jitter of the LEDs.

Figure 5:
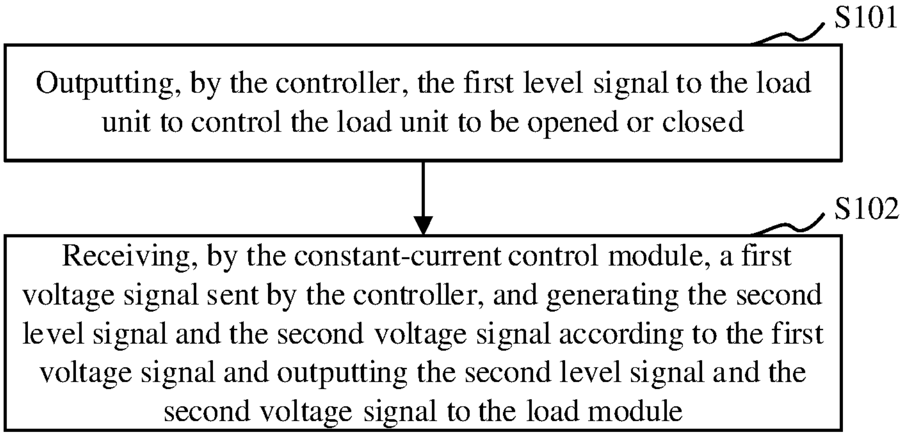
FIG. 5 schematically shows a flowchart of a method for constant-current control according to an embodiment of the present disclosure.

FIG. 5 schematically shows a flowchart of a method for constant-current control according to an embodiment of the present disclosure. As shown in FIG. 5, in an embodiment of the present disclosure, a method for constant-current control is provided, which is applied to the constant-current control circuit in the foregoing embodiments, and the method may include:

Step S101: outputting, by the controller, the first level signal to the load unit to control the load unit to be opened or closed.

Three first level signals LED_SW_1, LED_SW_2, and LED_SW_3 are output by the MCU controller 200 via three common pins, and are configured to control opening or closing of the LEDs 1, 2 and 3 of the single load unit 110.

Step S102: receiving, by the constant-current control module, a first voltage signal sent by the controller, and generating the second level signal and the second voltage signal according to the first voltage signal and outputting the second level signal and the second voltage signal to the load module.

After receiving the first voltage signal DAC1 via the non-inverting input terminal P1, the operational amplifier U1 outputs a level signal, that is, the second level signal LED_YF_OUT, via the output terminal OUT of the operational amplifier U1 according to the voltage carried by the first voltage signal DAC1, which is configured to control the opening or closing of the LEDs 1, 2 and 3 in all the load units 110 included in the load module 100.

The second voltage signal may be configured to control a magnitude of a current passing through the load unit. Further, the second level signal is a high-level signal in a case that the first voltage signal is a positive voltage.

Figure 6:
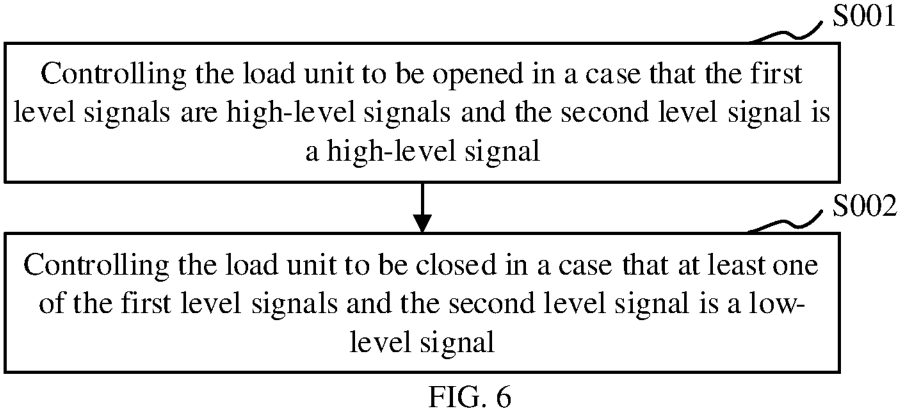
FIG. 6 schematically shows a flowchart of the step S101.

In an embodiment of the present disclosure, as shown in FIG. 6, the step S101 may include:

Step S001: controlling the load unit to be opened in a case that the first level signals are high-level signals and the second level signal is a high-level signal.

When the second level signal LED_YF_OUT is a high-level signal, that is, all of the LEDs 1, 2, and 3 in the load module 100 meet a necessary condition for opening. In a case that the second level signal LED_YF_OUT is at a high level, when the first level signal LED_SW_1 is a high-level signal, the NMOS transistor Q1 is opened, and the LED1 is opened;

when the first level signal LED_SW_2 is a high-level signal, the NMOS transistor Q2 is opened, and the LED2 is opened; and when the first level signal LED_SW_3 is a high-level signal, the NMOS transistor Q3 is opened, and the LED 3 is opened.

Step S002: controlling the load unit to be closed in a case that at least one of the first level signals and the second level signal is a low-level signal.

When the second level signal LED_YF_OUT is a high-level signal and the first level signal LED_SW_1 is a low-level signal, the NMOS transistor Q1 is closed, and the LED1 is closed;

when the second level signal LED_YF_OUT is a high-level signal and the first level signal LED_SW_2 is a low-level signal, the NMOS transistor Q2 is closed, and the LED2 is closed; and when the second level signal LED_YF_OUT is a high-level signal and the first level signal LED_SW_3 is a low-level signal, the NMOS transistor Q3 is closed, and the LED3 is closed.

When the second level signal LED_YF_OUT is a low-level signal, that is, all of the LEDs 1, 2, and 3 in the load module 100 do not meet a necessary condition for opening.

In an embodiment of the present disclosure, an electronic device is provided, which includes the constant-current control circuit in the foregoing embodiments.

In a typical configuration, the electronic device includes one or more processors (CPUs), an input/output interface, a network interface, and a memory.

The memory may include a memory in a form such as a non-persistent memory, a random access memory (RAM), and/or a non-volatile memory in a computer-readable medium, for example, a read-only memory (ROM) or a flash memory (flash RAM). The memory is an example of a computer-readable medium.

The computer-readable medium includes permanent, non-permanent, removable and non-removable media that can store information by using any method or technology. The information may be a computer readable instruction, a data structure, a program module, or other data. Examples of storage media of a computer include, but are not limited to, phase change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only disk read-only memory (CD ROM), digital versatile disk (DVD) or other optical storage, magnetic cassettes, magnetic tape magnetic disk storage or other magnetic storage devices or any other non-transmission medium, which can be used to store information that can be accessed by a computing device. As defined herein, the computer-readable medium does not include transitory computer readable media (transitory media), such as modulated data signals and carriers.

It should also be noted that the terms “include”, “contain” or any other variations thereof are intended to cover a non-exclusive inclusion, so that a process, a method, a commodity, or a device that includes a series of elements not only includes those elements, but also includes other elements that are not explicitly listed, or further includes elements inherent to the process, the method, the commodity, or the device. In the absence of more restrictions, an element defined by a statement “includes a” does not exclude the existence of additional identical elements in a process, a method, a commodity, or a device that includes the element.

The foregoing is merely embodiments of the present disclosure, and is not intended to limit present disclosure. For a person skilled in the art, the present disclosure may have various modifications and variations. Any modification, equivalent replacement, or improvement made without departing from the spirit and principle of the present disclosure shall fall within the scope of the claims of the present disclosure.

What is claimed is:

1. A constant-current control circuit, comprising:

a load module, comprising a plurality of load units connected in parallel;

a controller, connected to each load unit of the plurality of load units and configured to output a first level signal to the load unit; and a constant-current control module, connected to the controller and further connected to each load unit of the plurality of load units via at least one divided resistor, configured to receive a first voltage signal sent by the controller, and generate a second level signal and a second voltage signal according to the first voltage signal and output the second level signal and the second voltage signal to the load module.

2. The constant-current control circuit according to claim 1, wherein the constant-current control module comprises an operational amplifier, a non-inverting input terminal of the operational amplifier is connected to the controller, an inverting input terminal of the operational amplifier is connected to the load module, and an output terminal of the operational amplifier is connected to each load unit of the plurality of load units via the at least one divided resistor.

3. The constant-current control circuit according to claim 2, wherein the non-inverting input terminal of the operational amplifier is connected to the controller via a first resistor.

4. The constant-current control circuit according to claim 1, wherein the load unit comprises:

a load element; and a switching element connected to the load element, wherein the switching element is connected to the controller and is connected to the constant-current control module via the at least one divided resistor.

5. The constant-current control circuit according to claim 4, wherein the switching element is an N-Metal-Oxide-Semiconductor (NMOS) transistor, the controller is connected to a gate of the NMOS transistor, the constant-current control module is connected to a gate of the NMOS transistor via the at least one divided resistor, a drain of the NMOS transistor is connected to the load element, and a source of the NMOS transistor is connected to the constant-current control module.

6. The constant-current control circuit according to claim 4, wherein the switching element is a triode, the controller is connected to a base of the triode, the constant-current control module is connected to the base of the triode via the at least one divided resistor, a collector of the triode is connected to the load element, and an emitter of the triode is connected to the constant-current control module.

7. The constant-current control circuit according to claim 4, wherein the load element is an LED, an anode of the LED is connected to a power supply, and a cathode of the LED is connected to the switching element.

8. The constant-current control circuit according to claim 1, further comprising a filter capacitor, wherein an end of the filter capacitor is connected to the constant-current control module, and another end of the filter capacitor is connected to a grounding point via at least one filter resistor.

9. The constant-current control circuit according to claim 1, further comprising a current-limiting resistor, wherein the current-limiting resistor is connected between the constant-current control module and a grounding point.

10. A method for constant-current control, applied to the constant-current control circuit according to claim 1, wherein the method comprises:

outputting, by the controller, the first level signal to the load unit to control the load unit to be opened or closed; and receiving, by the constant-current control module, a first voltage signal sent by the controller, and generating the second level signal and the second voltage signal according to the first voltage signal and outputting the second level signal and the second voltage signal to the load module, wherein the second voltage signal is configured to control a magnitude of a current passing through the load unit.

11. The method for constant-current control according to claim 10, wherein the second level signal is a high-level signal in a case that the first voltage signal is a positive voltage.

12. The method for constant-current control according to claim 10, wherein the outputting, by the controller, the first level signal to the load unit to control the load unit to be opened or closed, comprises:

controlling the load unit to be opened in a case that the first level signal is a high-level signal and the second level signal is a high-level signal; and controlling the load unit to be closed in a case that at least one of the first level signal and the second level signal is a low-level signal.

13. An electronic device, comprising a constant-current control circuit, wherein the constant-current control circuit comprises:

a load module, comprising a plurality of load units connected in parallel;

a controller, connected to each load unit of the plurality of load units and configured to output a first level signal to the load unit; and a constant-current control module, connected to the controller and further connected to each load unit of the plurality of load units via at least one divided resistor, configured to receive a first voltage signal sent by the controller, and generate a second level signal and a second voltage signal according to the first voltage signal and output the second level signal and the second voltage signal to the load module.

14. The electronic device according to claim 13, wherein the constant-current control module comprises an operational amplifier, a non-inverting input terminal of the operational amplifier is connected to the controller, an inverting input terminal of the operational amplifier is connected to the load module, and an output terminal of the operational amplifier is connected to each load unit of the plurality of load units via the at least one divided resistor.

15. The electronic device according to claim 14, wherein the non-inverting input terminal of the operational amplifier is connected to the controller via a first resistor.

16. The electronic device according to claim 13, wherein the load unit comprises:

a load element; and a switching element connected to the load element, wherein the switching element is connected to the controller and is connected to the constant-current control module via the at least one divided resistor.

17. The electronic device according to claim 16, wherein the switching element is an N-Metal-Oxide-Semiconductor (NMOS) transistor, the controller is connected to a gate of the NMOS transistor, the constant-current control module is connected to a gate of the NMOS transistor via the at least one divided resistor, a drain of the NMOS transistor is connected to the load element, and a source of the NMOS transistor is connected to the constant-current control module.

18. The electronic device according to claim 13, wherein the constant-current control circuit further comprises a filter capacitor, an end of the filter capacitor is connected to the constant-current control module, and another end of the filter capacitor is connected to a grounding point via at least one filter resistor.

19. The electronic device according to claim 13, wherein the constant-current control circuit further comprises a current-limiting resistor, and the current-limiting resistor is connected between the constant-current control module and a grounding point.

20. The electronic device according to claim 16, wherein the load element is a Light-Emitting Diode (LED), an anode of the LED is connected to a power supply, and a cathode of the LED is connected to the switching element.

* * * * *